United States Patent
Tiemann

(10) Patent No.: US 7,719,264 B2
(45) Date of Patent: May 18, 2010

(54) ROTARY TRANSDUCER AND METHOD FOR OPERATING A ROTARY TRANSDUCER

(75) Inventor: Marc Oliver Tiemann, Nussdorf (DE)

(73) Assignee: Joannes Heidenhain GmbH, Traunreut (DE)

( * ) Notice: Subject to any disclaimer, the term of this patent is extended or adjusted under 35 U.S.C. 154(b) by 323 days.

(21) Appl. No.: 11/859,983

(22) Filed: Sep. 24, 2007

(65) Prior Publication Data
US 2008/0079422 A1 Apr. 3, 2008

(30) Foreign Application Priority Data
Sep. 29, 2006 (DE) .................. 10 2006 046 531

(51) Int. Cl.
*G01B 7/30* (2006.01)
*H01F 5/04* (2006.01)
(52) U.S. Cl. .................. 324/207.25; 324/207.16; 324/207.17
(58) Field of Classification Search ............ 324/207.15, 324/207.16, 207.17, 207.18, 207.19, 207.24, 324/207.25; 318/661
See application file for complete search history.

(56) References Cited

U.S. PATENT DOCUMENTS

| 5,092,051 | A | * | 3/1992 | Holmer et al. ........... 33/1 N |
| 6,111,402 | A | | 8/2000 | Fischer |
| 2003/0093907 | A1 | | 5/2003 | Schroter |

FOREIGN PATENT DOCUMENTS

| DE | 197 51 853 | 6/1998 |
| EP | 0 845 659 | 6/1998 |

OTHER PUBLICATIONS

Search Report, European Patent Application No. 07 01 2645, dated Apr. 3, 2008. (translated).

* cited by examiner

*Primary Examiner*—Kenneth J Whittington
(74) *Attorney, Agent, or Firm*—Kenyon & Kenyon LLP

(57) ABSTRACT

A rotary transducer includes a shaft, and a carrier body, on which an excitation winding and a detector system are arranged. To generate an electromagnetic field, it is possible to conduct an excitation current through the excitation winding, and the detector system is suitable for scanning the electromagnetic field influenced by a code carrier. The rotary transducer additionally includes an excitation control device and an evaluation device. The code carrier is secured in a rotatably fixed manner on the shaft for detecting the angular position of the shaft. The excitation control device is arranged such that it can be used to operate the excitation winding selectively in two different operating modes, in a manner such that, in the first operating mode, a first excitation current, and in the second operating mode, a second excitation current may be generated, the second excitation current being provided such that the electrical power consumption of the rotary transducer is lower in the second operating mode than in the first operating mode. The respective excitation current induces voltages in the detector system, which the evaluation device is able to process electronically to generate angular position information.

29 Claims, 4 Drawing Sheets

ROTARY TRANSDUCER AND METHOD FOR OPERATING A ROTARY TRANSDUCER

CROSS-REFERENCE TO RELATED APPLICATIONS

The present application claims priority to Application No. 10 2006 046 531.8, filed in the Federal Republic of Germany on Sep. 29, 2006, which is expressly incorporated herein in its entirety by reference thereto.

FIELD OF THE INVENTION

The present invention relates to a rotary transducer, e.g., for determining relative angle positions, which operates according to an inductive measuring principle, and to a method for operating a rotary transducer.

BACKGROUND INFORMATION

Inductive rotary transducers are used, for example, to determine the angular position of two machine parts that are rotatable relative to each other. In inductive rotary transducers, excitation windings and receiver coils are applied, for example, in the form of circuit traces, on a shared circuit board, which is permanently connected to a stator of a rotary transducer, for example. Situated across from this circuit board is another board, which generally takes the form of a code disk, on which alternating electrically conductive and nonconductive surfaces are mounted at periodic intervals as a scale-division region or scale-division structure, and which is connected to the rotor of the rotary transducer in a rotatably fixed manner. If an electric excitation field, which is alternating over time, is applied to the excitation windings by applying an excitation current, then signals are generated in the receiver coils during the relative rotation between rotor and stator as a function of the angular position. These signals are processed further in evaluation electronics.

Such rotary transducers are frequently used as measuring devices for electrical drives to determine the absolute angular position of respective drive shafts. In this context, it is important, particularly from the point of view of safety technology, that even after a system shutdown or in the event of a power failure, at least the rotations occurring in this state are counted.

German Published Patent Application No. 197 51 853 describes a construction of an inductive rotary transducer, in which the excitation and receiver coils are arranged in a multilayered circuit board structure.

For such a rotary transducer to be able to count at least the number and direction of the rotations performed even in the event of a failing mains voltage supply, additionally suitable magnets may be provided on the rotor and two magnet sensors on a stator circuit board, which generate counting signals. In this operating state, the magnet sensors are supplied by a buffer battery.

SUMMARY

Example embodiments of the present invention provide an inductive rotary transducer, which has a simple construction and which is able to generate position signals even in the event of a reduced supply of electrical energy. Furthermore, example embodiments of the present invention provide a method that allows for the use of a simply constructed rotary transducer, which generates position signals even in the event of a reduced supply of electrical energy.

According to example embodiments of the present invention, the rotary transducer includes a shaft and a carrier body, on which an excitation winding and a detector system are provided. To generate an electromagnetic field, it is possible to conduct an excitation current through the excitation winding, and the detector system is suitable for scanning the electromagnetic field influenced by a code carrier. The rotary transducer additionally includes an excitation control element and an evaluation element. The shaft is rotatable relative to the carrier body, the code carrier being secured on the shaft in a rotatably fixed manner for detecting its angular position. The excitation control element is arranged such that it is usable to operate the excitation winding selectively in two different operating modes, namely, in a manner such that in the first operating mode a first excitation current and in the second operating mode a second excitation current may be generated, the second excitation current being configured such that the electrical power consumption of the rotary transducer is lower in the second operating mode than in the first operating mode. The respective excitation current induces voltages in the detector system, which the evaluation element is able to process electronically to generate angular position information.

The excitation control element is, e.g., arranged in that a first excitation current is producible in the first operating mode and a second excitation current is producible in the second operating mode, the effective value of the second excitation current being smaller than that of the first excitation current. The effective value of the respective excitation current should be understood as the value by which in the same excitation winding the same energy is dissipated as a direct current of equal magnitude over the same time period, the time period having to exceed a certain minimum duration, for example, one second. In the second operating mode, the rotary transducer may be operated with less electrical energy than in the first operating mode.

The angular position information generated in the second operating mode may have a coarser resolution than the angular position information generated in the first operating mode. This means that the precision of the detection of the angular position in the second operating mode is reduced vis-à-vis the one in the first operating mode.

The detector system may include a first detector winding and a second detector winding, the first detector winding providing within one rotation relative to the carrier body a different number of signal periods compared to the second detector winding. The first detector winding may provide an odd number of signal periods, e.g., if the first detector winding provides only one signal period during one rotation.

Furthermore, the first detector winding may provide within one rotation relative to the carrier body a smaller number of signal periods than the second detector winding.

The rotary transducer may be configured such that, for generating angular position information in the second operating mode, only the voltage induced in the first detector winding is detectable, while in the first operating mode in addition to this the evaluation element is able to process electronically also the induced voltages of the second detector winding. Accordingly, to generate angular position information in the second operating mode, the evaluation element electronically processes the voltage induced in the first detector winding, while at the same time the voltage induced in the second detector winding is ignored in the electronic processing, that is, the voltage induced in the second detector winding is switched away or disconnected from the electronic processing device. Thus, in the second operating mode, the second detector winding is without function for the generation of angular position information. In the first operating mode, by contrast, both the voltage induced in the first detector winding as well as the voltage induced in the second detector winding are electronically processed for generating angular position information.

The excitation control element and the evaluation element may be integrated in one ASIC chip.

The excitation control element may be arranged such that the second excitation current may be generated as a pulsed current. For example, the second excitation current may have current breaks. Current breaks should be understood as time periods during which the excitation current returns practically to zero.

The rotary transducer itself may have a battery for supplying current to the rotary transducer in the second operating mode.

According to example embodiments of the present invention, a method for operating a rotary transducer includes: selecting a first or second operating mode; generating an excitation current in the excitation winding with the aid of the excitation control element, a first excitation current being generated in the first operating mode and a second excitation current being generated in the second operating mode, the second excitation current being configured such that the electrical power consumption of the rotary transducer is lower in the second operating mode than in the first operating mode; detecting the voltage induced by the respective excitation current in the detector system; and electronic processing of the induced voltage to produce angular position information.

In particular, the excitation currents are generated such that the effective value of the second excitation current is smaller than that of the first excitation current.

The first or the second operating mode may be selected as a function of the voltage applied on the rotary transducer. For this purpose, the magnitude of the actually applied voltage level or the respective voltage curve (e.g., direct current, alternating current) may be used as criteria, for example.

The excitation current in the second operating mode may be configured such that the time interval between adjacent maximum currents is, e.g., at least 100 times, e.g., at least 1,000 times or, e.g., at least 2,500 times greater than the time interval of adjacent maximum currents in the first operating mode. The excitation current reaches a maximum current when it has its maximum amplitude. A maximum current should be understood as an absolute value such that in this case a maximum current exists even in the case—in terms of absolute value—a maximum negative current. If the excitation current does not have a distinct singular maximum, e.g., if there are square-wave pulses in which the maximum current remains constant over a certain time period, then the above-mentioned time intervals should be understood in terms of the average in time of the maximum current, e.g., the point in time between the edges of a square-wave pulse.

The detector system may include a first detector winding and a second detector winding, the first detector winding providing within one rotation relative to the carrier body a different number of signal periods as compared to the second detector winding, and in the second operating mode only the voltage induced in the first detector winding being detected and processed for generating angular position information. Furthermore, in the first operating mode, it is also possible to detect the voltage induced in the second detector winding and to process it for generating angular position information.

According to an example embodiment of the present invention, a rotary transducer includes: a shaft; a carrier body, at least one excitation winding and at least one detector system provided on the carrier body, the excitation winding configured to conduct an excitation current to generate an electromagnetic field, the detector system configured to scan the electromagnetic field influenced by a code carrier; an excitation control device; and an evaluation device. The shaft is rotatable relative to the carrier body, and the code carrier is rotatably fixedly secured on the shaft to detect an angular position of the shaft. The excitation control device is configured to operate the excitation winding selectively in two different operating modes, in a first operating mode, a first excitation current being generated, and, in a second operating mode, a second excitation current being generated. Electrical power consumption of the rotary transducer is lower in the second operating mode than in the first operating mode. The excitation currents induce respective voltages in the detector system, and the evaluation device is configured to electronically process the voltages to generate angular position information.

The angular position information generated in the second operating mode may have a coarser resolution than the angular position information generated in the first operating mode.

The detector system may include a first detector winding and a second detector winding, and the first detector winding may be configured to provide, within one rotation relative to the carrier body, a different number of signal periods than the second detector winding.

The first detector winding may be configured to provide an odd number of signal periods.

The first detector winding may be configured to provide, within one rotation relative to the carrier body, a smaller number of signal periods than the second detector winding.

The evaluation device may be configured to electronically process, in the second operating mode, the voltage induced in the first detector winding, the voltage induced in the second detector winding being negligible for the electronic processing, and the evaluation device may be configured to electronically process, in the first operating mode, the voltages induced in both the first detector winding and the second detector winding.

The excitation control device and the evaluation device may be integrated in one ASIC chip.

The second excitation current may be a pulsed current.

The second excitation current may include current breaks.

The rotary transducer may include a battery configured to supply the rotary transducer with current in the second operating mode.

According to an example embodiment of the present invention, a method for operating a rotary transducer including: a shaft; a carrier body, at least one excitation winding and at least one detector system provided on the carrier body, the excitation winding configured to conduct an excitation current to generate an electromagnetic field, the detector system configured to scan the electromagnetic field influenced by a code carrier; an excitation control device; and an evaluation device, the shaft rotatable relative to the carrier body and the code carrier rotatably fixedly secured on the shaft to detect an angular position of the shaft, includes: selecting one of (a) a first operating mode and (b) a second operating mode; generating an excitation current in the excitation winding by the excitation control device, a first excitation current being generated in the first operating mode and a second excitation current being generated in the second operating mode, an electrical power consumption of the rotary transducer in the second operating more being lower than in the first operating mode; detecting, in the detector system, a voltage induced by the excitation current; and electronically processing the induced voltage to generate angular position information.

The one of (a) the first operating mode and (b) the second operating mode may be selected in the selecting step as a function of a voltage applied to the rotary transducer.

A time interval between adjacent maximum currents in the second excitation current may be at least 100 times greater than a time interval between adjacent maximum currents of the first excitation current.

A time interval between adjacent maximum currents in the second excitation current may be at least 1,000 times greater than a time interval between adjacent maximum currents of the first excitation current.

The detector system may include a first detector winding and a second detector winding, the first detector winding configured to provide, within one rotation relative to the carrier body, a different number of signal periods than the second detector winding. In the second operating mode, the electronic processing step may include electronically processing the voltage induced in the first detector winding and ignoring the voltage induced in the second detector winding, and, in the first operating mode, the electronic processing step may include electronically processing the voltages induced in both the first detector winding and the second detector winding.

The first excitation current may have a greater maximum amplitude than the second excitation current.

According to an example embodiment of the present invention, a method for operating a rotary transducer includes: selecting one of (a) a first operating mode and (b) a second operating mode of an excitation winding arranged on a carrier body; generating an excitation current in the excitation winding by an excitation control device, a first excitation current being generated in the first operating mode and a second excitation current being generated in the second operating mode, an electrical power consumption of the rotary transducer in the second operating more being lower than in the first operating mode; detecting, in a detector system, a voltage induced by the excitation current; and electronically processing the induced voltage to generate angular position information.

Further features and aspects of example embodiments of the present invention are described in more detail below with reference to the appended Figures.

DETAILED DESCRIPTION

Figure 1:
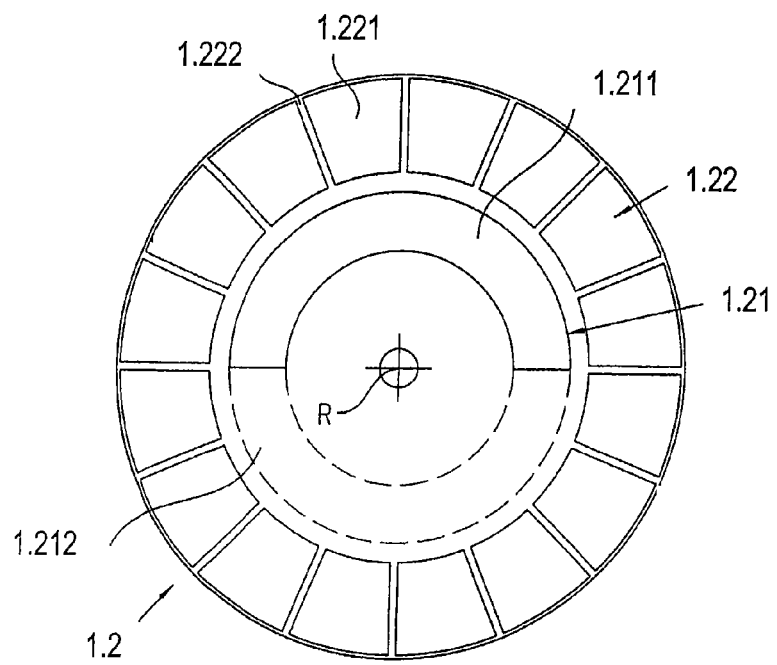
FIG. 1 is a top view of a code disk.
Figure 2:
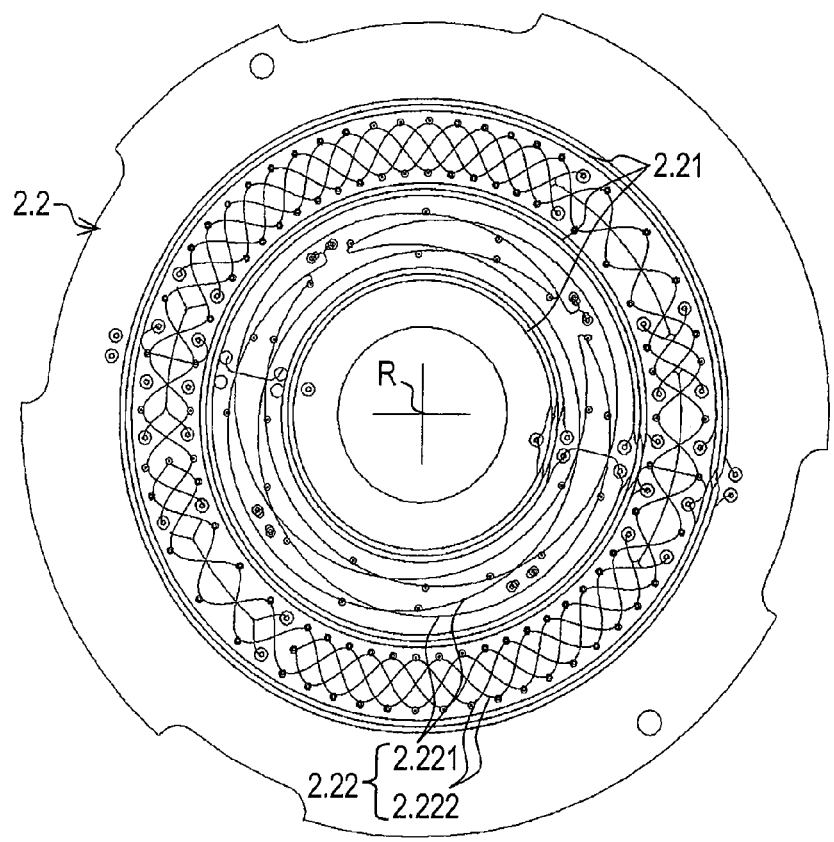
FIG. 2 is a top view of a scanning circuit board.
Figure 6:
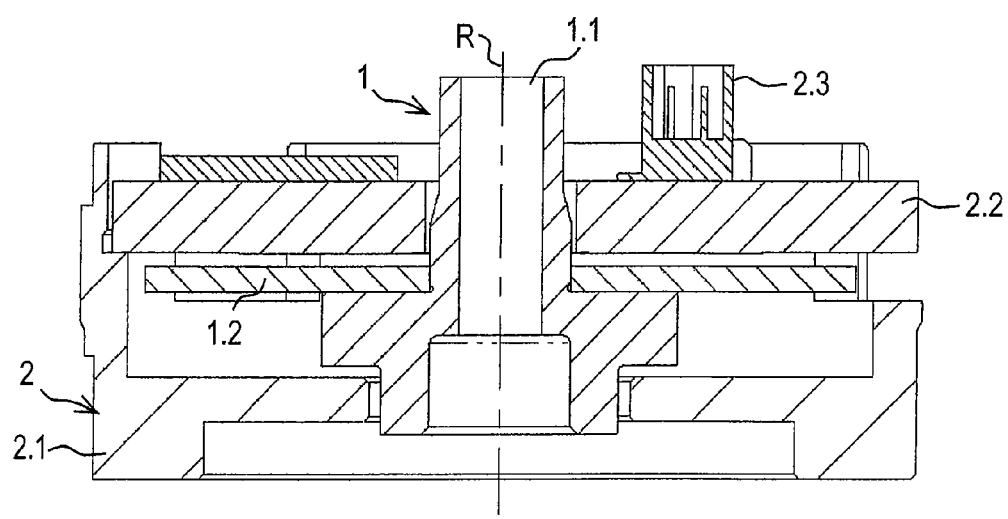
FIG. 6 is a cross-sectional view of a rotary transducer.

FIGS. 1, 2 and 6 show the fundamental structure of a rotary transducer according to an example embodiment of the present invention. As illustrated in FIG. 6, the rotary transducer has a rotor 1 and a stator 2. In the exemplary embodiment illustrated, rotor 1 includes a shaft 1.1, which may be mounted in a torsionally fixed manner, for example, on an motor shaft to be measured. On an offset of shaft 1.1, for the purpose of detecting its angular position, the code carrier is secured in a torsionally fixed manner in the form of a code disk 1.2 having scale-division tracks 1.21, 1.22.

Stator 2 includes a housing 2.1, on which an annular scanning circuit board 2.2 is fixed as the carrier body. Among other things, a plug connector 2.3 is mounted on scanning circuit board 2.2, via which signals and electrical power may be transmitted. Rotor 1 and stator 2 or shaft 1.1 and housing 2.1 are rotatable relative to each other about an axis of rotation R.

FIG. 1 is a top view of code disk 1.2. Code disk 1.2 includes a substrate, which in the illustrated exemplary embodiment is formed of epoxide resin and is situated on the two scale-division tracks 1.21, 1.22. Scale-division tracks 1.21, 1.22 have an annular shape and with respect to axis of rotation R are situated concentrically on the substrate at different diameters. Each of the two scale-division tracks 1.21, 1.22 includes a periodic sequence of alternating electrically conductive scale-division regions 1.211, 1.221 and non-conductive scale-division regions 1.212, 1.222. As a material for electrically conductive scale-division regions 1.211, 1.221, copper is applied onto the substrate in the example illustrated. In non-conductive scale-division regions 1.212, 1.222, by contrast, substrate 2.3 is not coated.

In the example embodiment illustrated, inner scale-division track 1.21 includes a first semiannular scale-division region 1.211 having electrically conductive material, e.g., copper, as well as a second semiannular scale-division 1.212 in which no conductive material is provided.

Radially adjacent to first scale-division track 1.21 on the substrate is second scale-division track 1.22, scale-division track 1.22 also including a plurality of electrically conductive scale-division regions 1.221 and non-conductive scale-division regions 1.222 situated in between. In terms of material, the different scale-division regions 1.221, 1.222 are configured in the same manner as scale-division regions 1.211, 1.212 of first scale-division track 1.21. Second scale-division track 1.22 in the exemplary embodiment illustrated includes sixteen periodically arranged, electrically conductive scale-division regions 1.221 and accordingly sixteen non-conductive scale-division regions 1.222 arranged in between.

Scanning circuit board 2.2 illustrated in FIG. 2 and provided for scanning code disk 1.2 is used as a carrier body, among other things, for a detector system, which includes different receiver coils 2.22. These receiver coils 2.22 have receiver circuit traces 2.221 in an inner receiver track as first detector windings and additional receiver circuit traces 2.222 in an outer receiver track as second detector windings. For this purpose, related pairs of receiver circuit traces 2.221, 2.222 of a respective receiver track are offset relative to each other such that they are able to provide signals that are phase-offset by 90°.

In addition, excitation circuit traces 2.21 are provided as excitation windings on scanning circuit board 2.2, which are applied onto an inner, a center and an outer excitation track. Scanning circuit board 2.2 itself has a central bore hole and is arranged as a printed circuit board having several layers.

In the assembled state, code disk 1.2 and scanning circuit board 2.2 are opposite each other such that axis R extends through the centers of both components and in the event of a relative rotation between code disk 1.2 and scanning circuit board 2.2 it is possible to generate by induction effects a signal in scanning circuit board 2.2 that is a function of the respective angular position.

The precondition for forming corresponding signals is that excitation circuit traces 2.21 generate an electromagnetic excitation field that alternates over time in the region of the scanning tracks or in the region of the scale-division tracks 1.21 and 1.22 scanned thereby. In the exemplary embodiment illustrated, excitation circuit traces 2.21 take the form of multiple planar-parallel, current-carrying, individual circuit traces. If excitation circuit traces 2.21 of a circuit trace unit all carry an excitation current in the same direction, then a tubular or cylindrical directed electromagnetic field is formed around the respective circuit trace unit. The field lines of the resulting electromagnetic field extend in the form of concentric circles around the circuit trace units, the direction of the field lines depending on the direction of the current in the circuit trace units. For this purpose, the direction of the current in the circuit trace units directly adjacent to a shared scanning track or the corresponding interconnection of these circuit trace units is to be selected to be opposite such that the field lines in the region of the scanning tracks have in each case the same orientation.

Figure 5:
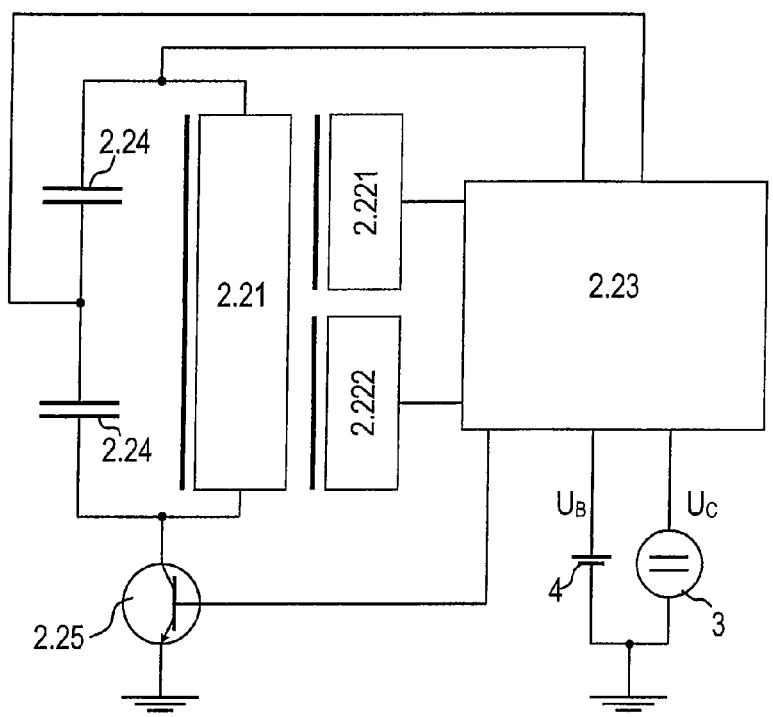
FIG. 5 is a schematic circuit diagram.

FIG. 5 schematically illustrates a circuit, with reference to which the manner of functioning of the rotary transducer is explained. The rotary transducer is connected to an external direct voltage source 3 via plug connector 2.3 (see, e.g., FIG. 6) and a cable. In normal operation, the rotary transducer is supplied by external direct voltage source 3. In the exemplary embodiment illustrated, the voltage Uc of direct voltage source 3 is, e.g., five volts.

In the event that for any reason direct voltage source 3 is not available, the rotary transducer is temporarily supplied with electrical energy by a battery 4, the voltage supplied by battery 4 possibly being three volts, for example. Battery 4 may be accommodated either directly in the rotary transducer, for example, on scanning circuit board 2.2, or externally such that the electrical energy supplied by battery 4 may also enter the rotary transducer via the cable and plug connector 2.3.

Figure 3A:
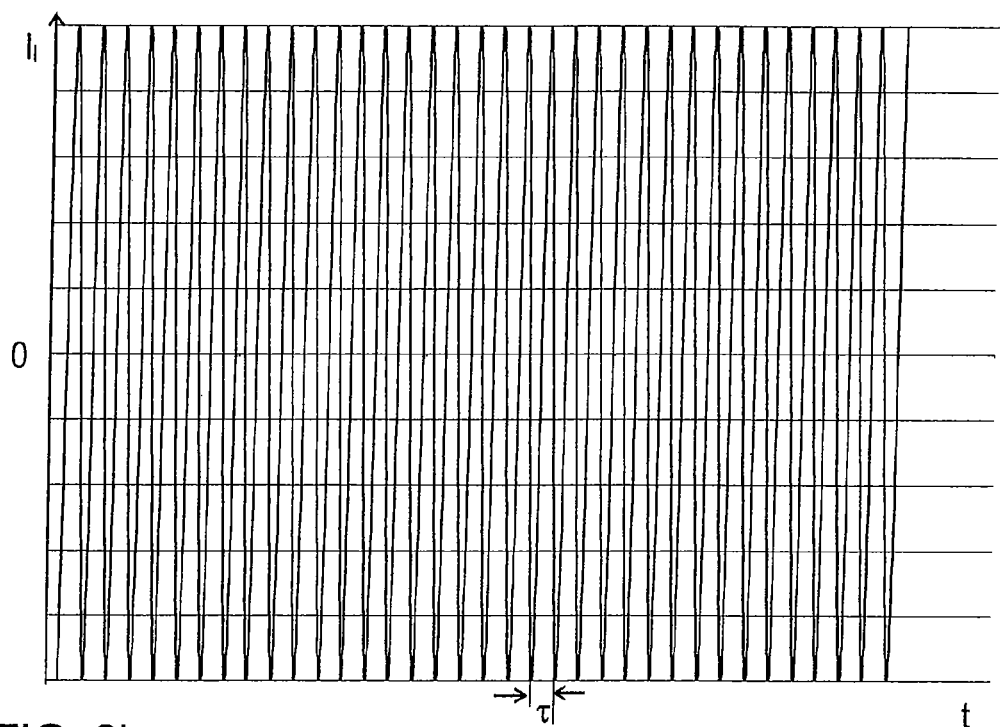
FIG. 3a illustrates a signal characteristic of an excitation current in excitation windings in a first operating mode.

An ASIC chip 2.23 is mounted on scanning circuit board 2.2, which functions as an excitation control device, controlling the generation of excitation current $I_I$, $I_{II}$. The configuration of excitation current $I_I$, $I_{II}$ depends on whether the rotary transducer is supplied by direct voltage source 3 or by battery 4. Accordingly, ASIC chip 2.23 is connected to a supply line such that the currently existing voltage $U_C$ or $U_B$ is applied on an input of ASIC chip 2.23. If ASIC chip 2.23 determines that voltage $U_C$ is applied on the rotary transducer, that is, if the rotary transducer is in normal operation, ASIC chip 2.23 drives excitation circuit traces 2.21 in a first operating mode using a first excitation current $I_I$. In the first operating mode, excitation current $I_I$ has a frequency of, e.g., one MHz in the exemplary embodiment illustrated such that the time interval $\tau_I$ between adjacent maximum currents is, e.g., 1 µs in the first operating mode 1. Capacitors 2.24 and excitation circuit traces 2.21, which form an electrical oscillating circuit are dimensioned accordingly. ASIC chip 2.23 is configured such that in each zero crossing of excitation current $I_I$, the oscillating circuit is supplied with a minimal current pulse, which is dimensioned such that just the losses in the oscillating circuit are compensated. Accordingly, as illustrated in FIG. 3a, excitation current $I_I$ in the first operating mode may be referred to as a periodic excitation current $I_I$, its maximum amplitude having a value of, e.g., +70 mA or −70 mA in the illustrated exemplary embodiment.

In receiver coils 2.22, that is, in receiver circuit traces 2.221, 2.222, first excitation current $I_I$ induces voltages $U_I$ as a function of the angular position of code disk 1.2. Receiver circuit traces 2.221 include two circuit traces, which supply voltage signals that are offset by 90°. Within one rotation relative to the carrier body, that is, at a rotational angle of 2π (360°), receiver circuit traces 2.221 provide in each case a single signal period when scanning scale-division track 1.21. The offset arrangement of the circuit traces in the region of receiver circuit traces 2.221 produces two induced voltages $U_I$ in the operation of the rotary transducer whose envelopes have a phase offset of 90° with respect to each other.

The scanning of scale-division track 1.21 thus results in a relatively rough absolute position information within one rotation of code disk 1.2 about axis of rotation R. These signals provide a clear absolute position signal within one rotation of a shaft 1.1. An evaluation of the signals phase-offset by 90° additionally provides for detection of the direction of the rotary motion.

The additional receiver circuit traces 2.222 on the second, outer scanning track are used for scanning second scale-division track 1.22. A relative offset is also provided between the two receiver circuit traces 1.7, 1.8 such that when scanning second scale-division track 1.22 two signals are produced on the output side, the envelopes of which have a 90° phase offset with respect to each other.

Outer receiver circuit traces 2.222 each have sixteen, that is, $2^4$, windings such that using outer receiver circuit traces 2.222 it is possible to generate a comparatively high resolution incremental signal in the relative motion of code disk 1.2 with respect to scanning circuit board 2.2. Within one rotation relative to the carrier body, that is, at a rotational angle of 2π(360°), receiver circuit traces 2.222 provide in each case sixteen signal periods when scanning scale-division track 1.22.

In combination with the rough absolute position determination via first scale-division track 1.21, such a system allows for a high-resolution absolute determination of the angle of rotation.

Figure 3B:
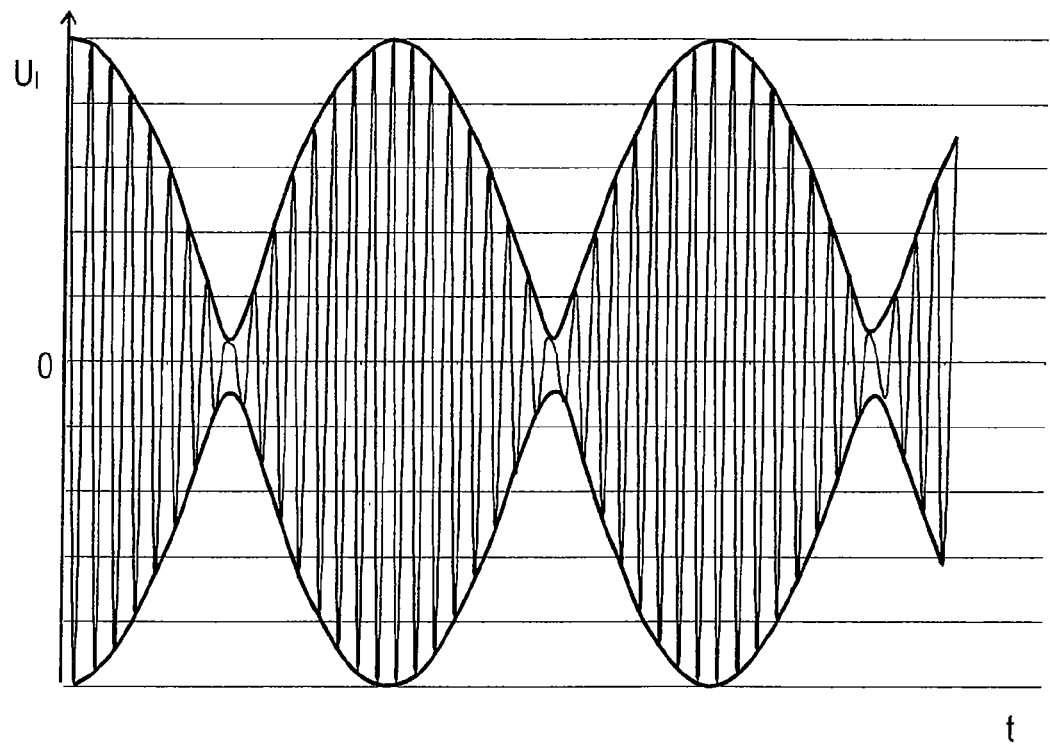
FIG. 3b illustrates a signal characteristic of an induced voltage in detector windings in the first operating mode.

FIG. 3b illustrates a time characteristic of voltages $U_I$ in one of receiver circuit traces 2.221 as well as the two enveloping sinusoidal curves. In combination with the induced voltages $U_I$ of the remaining receiver circuit traces 2.221, 2.222, it is possible by a demodulation process to form corresponding sinusoidal signals, by which it is possible to determine the exact angular position of shaft 1.1. For this purpose, ASIC chip 2.23, which acts at the same time as an evaluation device, processes induced voltages $U_I$ electronically such that a corresponding angular position information for shaft 1.1 is generated. Thus, accordingly, the excitation control element and the evaluation device are integrated in a single ASIC chip.

As a consequence of the high frequency of excitation current $I_I$, it is possible to retrieve the current angular position information from the rotary transducer practically at any time. Additionally, it is possible to count whole rotations.

Figure 4A:
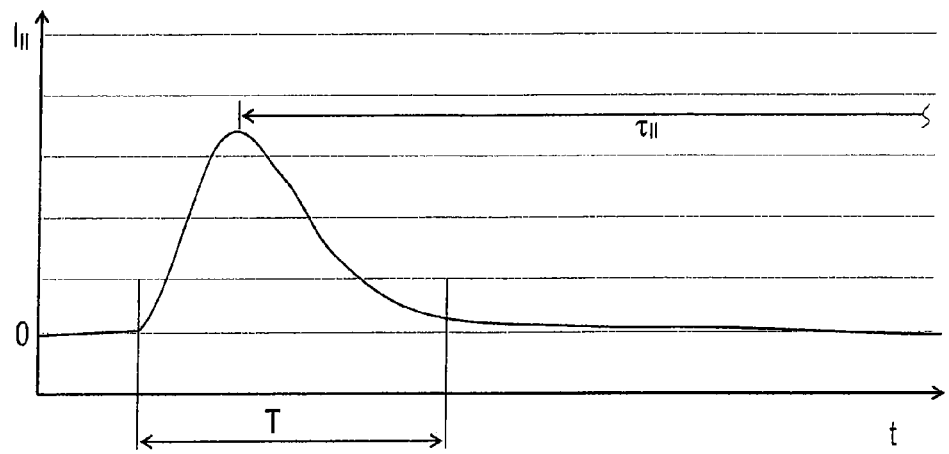
FIG. 4a illustrates a signal characteristic of the excitation current in the excitation windings in a second operating mode.

If, for example, due to a power failure, direct voltage source 3 is not available, then voltage $U_B$ of battery 4 is applied on the rotary transducer. ASIC chip 2.23 detects this and thereupon selects the second operating mode such that ASIC chip 2.23 operates excitation circuit traces 2.21 in the substantially more current-saving second operating mode, the effective value of second excitation current $I_{II}$ being smaller than that of first excitation current $I_I$. In the second operating mode, a pulsed excitation current $I_{II}$ is produced, as illustrated in FIG. 4a. That is to say that as a consequence of the monitoring of ASIC chip 2.23 current pulses of a frequency of 200 Hz, for example, are applied to excitation circuit traces 2.21 such that the time interval $\tau_{II}$ between adjacent maximum currents in the second operating mode is, e.g., 0.005 s. Thus, in the second operating mode, the time interval $\tau_{II}$ between adjacent maximum currents is, e.g., 5,000 times greater than the time interval $\tau_I$ of adjacent maximum currents $I_I$ in the first operating mode. In the second operating mode, there is a current break between the pulses, in which the value of excitation current $I_{II}$ in the second operating mode practically equals zero. Because of the comparatively low frequency and the low pulse time (e.g., T=1 μs) as well as a low current amplitude (e.g., maximum amplitude=20 mA), the power requirement of the rotary transducer in the second operating mode is significantly reduced in comparison to that of the first operating mode, or the electrical power consumption, that is, the rotary transducer's electrical energy requirement with respect to one operating second, is significantly lower in the second operating mode than in the first operating mode. In the second operating mode and in the first operating mode, the same excitation circuit traces 2.21 carry second excitation current $I_{II}$ and first excitation current $I_I$, respectively.

Figure 4B:
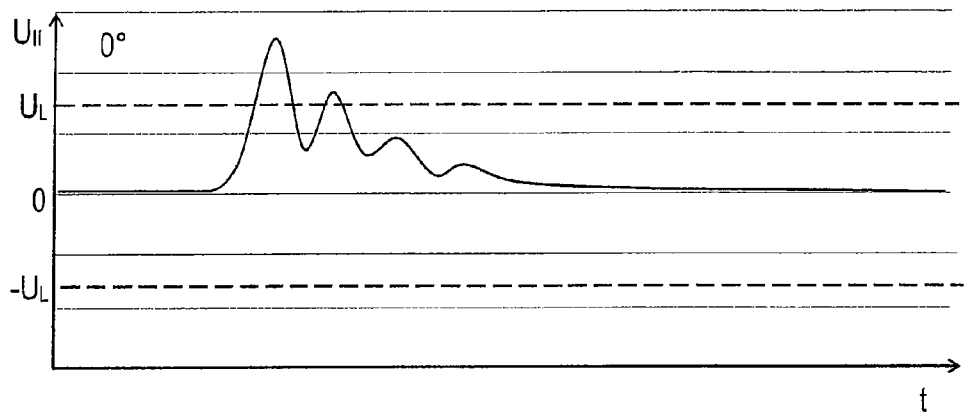
FIG. 4b illustrates a signal characteristic of the induced voltage in a detector winding in the second operating mode (0° phase).
Figure 4C:
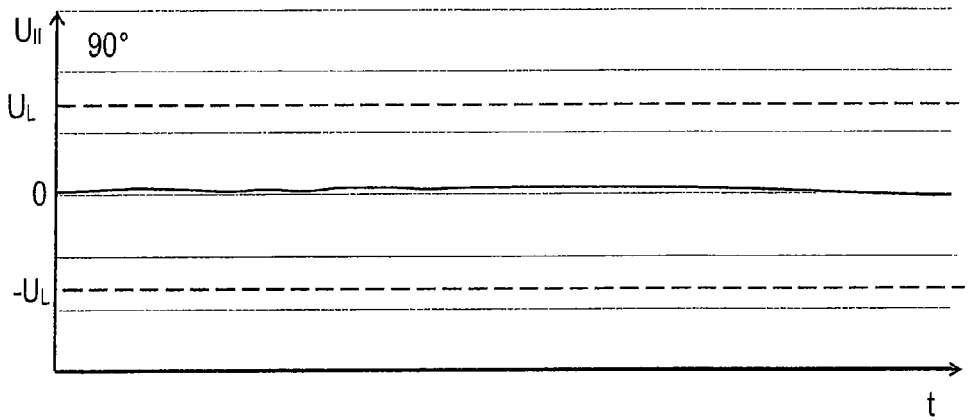
FIG. 4c illustrates a signal characteristic of the induced voltage in a detector winding in the second operating mode (90° phase).

As a function of the angular position of code disk 1.2, pulsed excitation current $I_{II}$ induces a voltage $U_{II}$ (response pulse) in receiver circuit traces 2.221. As already described, receiver circuit traces 2.221 include two circuit traces, which as a result supply voltage signals that are offset by 90°. FIG. 4b illustrates, by way of example, the time characteristic of voltage $U_{II}$ as it is induced in the first of receiver circuit traces 2.221 (e.g., 0° phase). ASIC chip 2.23, operating as an evaluation device, determines that voltage $U_{II}$ (0°) has exceeded a threshold value $U_L$. At the same time, it is also established that voltage $U_{II}$ (90°) induced in the second of receiver circuit traces 2.221 (e.g., 90° phase) has not reached threshold value $U_L$.

As evaluation device, ASIC chip 2.23 processes these input conditions electronically so as to generate angular position information. The angular position information generated in the second operating mode is comparatively rough or imprecise. It is nevertheless possible to determine to which quadrant the angular position of shaft 1.1 is to be assigned. This is important, for example, when a suspended load continues to move the motor shaft uncontrolled. It is at least possible to determine in the second operating mode how many rotations shaft 1.1 has performed and in which direction. Accordingly, the number of rotations may also be counted in the event of a failure of direct voltage source 3 such that the number of rotations is not lost.

Depending on the position of code disk 1.2, induced voltage $U_{II}$ may also fall below lower threshold value $-U_L$. Thus, for each phase a determination is made as to whether $U_{II} \geq U_L$, $-U_L < U_{II} < +U_L$ or $U_{II} \leq U_L$. Accordingly, a clear quadrant assignment may be made for the position of shaft 1.1.

What is claimed is:

1. A rotary transducer, comprising:
   a shaft;
   a carrier body, at least one excitation winding and at least one detector system provided on the carrier body, the excitation winding configured to conduct an excitation current to generate an electromagnetic field, the detector system configured to scan the electromagnetic field influenced by a code carrier;
   an excitation control device; and
   an evaluation device;
   wherein the shaft is rotatable relative to the carrier body and the code carrier is rotatably fixedly secured on the shaft to detect an angular position of the shaft;
   wherein the excitation control device is configured to operate the excitation winding selectively in two different operating modes, in a first operating mode, a first excitation current being generated, and, in a second operating mode, a second excitation current being generated;
   wherein electrical power consumption of the rotary transducer is lower in the second operating mode than in the first operating mode;
   wherein the excitation currents induce respective voltages in the detector system, the evaluation device configured to electronically process the voltages to generate angular position information;
   wherein the detector system includes a first detector winding and a second detector winding, the first detector winding configured to provide, within one rotation relative to the carrier body, a different number of signal periods than the second detector winding;
   wherein the evaluation device is configured to electronically process, in the second operating mode, the voltage induced in the first detector winding, the voltage induced in the second detector winding being negligible for the electronic processing; and
   wherein the evaluation device is configured to electronically process, in the first operating mode, the voltages induced in both the first detector winding and the second detector winding.

2. The rotary transducer according to claim 1, wherein the angular position information generated in the second operating mode has a coarser resolution than the angular position information generated in the first operating mode.

3. The rotary transducer according to claim 1, wherein the first detector winding is configured to provide an odd number of signal periods.

4. The rotary transducer according to claim 3, wherein the first detector winding is configured to provide, within one rotation relative to the carrier body, a smaller number of signal periods than the second detector winding.

5. The rotary transducer according to claim 1, wherein the excitation control device and the evaluation device are integrated in one ASIC chip.

6. The rotary transducer according to claim 1, wherein the second excitation current is a pulsed current.

7. The rotary transducer according to claim 1, wherein the second excitation current includes current breaks.

8. The rotary transducer according to claim 1, further comprising a battery configured to supply the rotary transducer with current in the second operating mode.

9. A method for operating the rotary transducer of claim 1, comprising:
   selecting one of (a) the first operating mode and (b) the second operating mode of the excitation winding arranged on the carrier body;
   generating the excitation current in the excitation winding by the excitation control device, the first excitation current being generated in the first operating mode and the second excitation current being generated in the second operating mode, the electrical power consumption of the rotary transducer in the second operating mere mode being lower than in the first operating mode;
   detecting, in the detector system, a voltage induced by the excitation current; and
   electronically processing the induced voltage to generate angular position information.

10. A method for operating a rotary transducer including: a shaft; a carrier body, at least one excitation winding and at least one detector system provided on the carrier body, the excitation winding configured to conduct an excitation current to generate an electromagnetic field, the detector system configured to scan the electromagnetic field influenced by a code carrier; an excitation control device; and an evaluation device, the shaft rotatable relative to the carrier body and the code carrier rotatably fixedly secured on the shaft to detect an angular position of the shaft, comprising:

selecting one of (a) a first operating mode and (b) a second operating mode;

generating an excitation current in the excitation winding by the excitation control device, a first excitation current being generated in the first operating mode and a second excitation current being generated in the second operating mode, an electrical power consumption of the rotary transducer in the second operating being lower than in the first operating mode;

detecting, in the detector system, a voltage induced by the excitation current; and electronically processing the induced voltage to generate angular position information;

wherein a time interval between adjacent maximum currents in the second excitation current is at least 100 times greater than a time interval between adjacent maximum currents of the first excitation current.

11. The method according to claim 10, wherein the angular position information generated in the second operating mode has a coarser resolution than the angular position information generated in the first operating mode.

12. The method according to claim 10, wherein the one of (a) the first operating mode and (b) the second operating mode is selected in the selecting step as a function of a voltage applied to the rotary transducer.

13. The method according to claim 10, wherein the second excitation current is a pulsed current.

14. The method according to claim 10, wherein the second excitation current includes current breaks.

15. A method for operating a rotary transducer including: a shaft; a carrier body, at least one excitation winding and at least one detector system provided on the carrier body, the excitation winding configured to conduct an excitation current to generate an electromagnetic field, the detector system configured to scan the electromagnetic field influenced by a code carrier; an excitation control device; and an evaluation device, the shaft rotatable relative to the carrier body and the code carrier rotatably fixedly secured on the shaft to detect an angular position of the shaft, comprising:

selecting one of (a) a first operating mode and (b) a second operating mode;

generating an excitation current in the excitation winding by the excitation control device, a first excitation current being generated in the first operating mode and a second excitation current being generated in the second operating mode, an electrical power consumption of the rotary transducer in the second operating mode being lower than in the first operating mode;

detecting, in the detector system, a voltage induced by the excitation current; and electronically processing the induced voltage to generate angular position information;

wherein a time interval between adjacent maximum currents in the second excitation current is at least 1,000 times greater than a time interval between adjacent maximum currents of the first excitation current.

16. The method according to claim 15, wherein the angular position information generated in the second operating mode has a coarser resolution than the angular position information generated in the first operating mode.

17. The method according to claim 15, wherein the one of (a) the first operating mode and (b) the second operating mode is selected in the selecting step as a function of a voltage applied to the rotary transducer.

18. The method according to claim 15, wherein the second excitation current is a pulsed current.

19. The method according to claim 15, wherein the second excitation current includes current breaks.

20. A method for operating a rotary transducer including: a shaft; a carrier body, at least one excitation winding and at least one detector system provided on the carrier body, the excitation winding configured to conduct an excitation current to generate an electromagnetic field, the detector system configured to scan the electromagnetic field influenced by a code carrier; an excitation control device; and an evaluation device, the shaft rotatable relative to the carrier body and the code carrier rotatably fixedly secured on the shaft to detect an angular position of the shaft, comprising:

selecting one of (a) a first operating mode and (b) a second operating mode;

generating an excitation current in the excitation winding by the excitation control device, a first excitation current being generated in the first operating mode and a second excitation current being generated in the second operating mode, an electrical power consumption of the rotary transducer in the second operating mode being lower than in the first operating mode;

detecting, in the detector system, a voltage induced by the excitation current; and electronically processing the induced voltage to generate angular position information;

wherein the detector system includes a first detector winding and a second detector winding, the first detector winding configured to provide, within one rotation relative to the carrier body, a different number of signal periods than the second detector winding;

wherein, in the second operating mode, the electronic processing step includes electronically processing the voltage induced in the first detector winding and ignoring the voltage induced in the second detector winding; and wherein, in the first operating mode, the electronic processing step includes electronically processing the voltages induced in both the first detector winding and the second detector winding.

21. The method according to claim 20, wherein the angular position information generated in the second operating mode has a coarser resolution than the angular position information generated in the first operating mode.

22. The method according to claim 20, wherein the one of (a) the first operating mode and (b) the second operating mode is selected in the selecting step as a function of a voltage applied to the rotary transducer.

23. The method according to claim 20, wherein the second excitation current is a pulsed current.

24. The method according to claim 20, wherein the second excitation current includes current breaks.

25. A method for operating a rotary transducer including: a shaft; a carrier body, at least one excitation winding and at least one detector system provided on the carrier body, the excitation winding configured to conduct an excitation current to generate an electromagnetic field, the detector system configured to scan the electromagnetic field influenced by a code carrier; an excitation control device; and an evaluation device, the shaft rotatable relative to the carrier body and the code carrier rotatably fixedly secured on the shaft to detect an angular position of the shaft, comprising:

selecting one of (a) a first operating mode and (b) a second operating mode;

generating an excitation current in the excitation winding by the excitation control device, a first excitation current being generated in the first operating mode and a second excitation current being generated in the second operating mode, an electrical power consumption of the rotary transducer in the second operating mode being lower than in the first operating mode;

detecting, in the detector system, a voltage induced by the excitation current; and electronically processing the induced voltage to generate angular position information;

wherein the first excitation current has a greater maximum amplitude than the second excitation current.

26. The method according to claim 25, wherein the angular position information generated in the second operating mode has a coarser resolution than the angular position information generated in the first operating mode.

27. The method according to claim 25, wherein the one of (a) the first operating mode and (b) the second operating mode is selected in the selecting step as a function of a voltage applied to the rotary transducer.

28. The method according to claim 25, wherein the second excitation current is a pulsed current.

29. The method according to claim 25, wherein the second excitation current includes current breaks.

* * * * *

UNITED STATES PATENT AND TRADEMARK OFFICE
CERTIFICATE OF CORRECTION

| | |
|---|---|
| PATENT NO. | : 7,719,264 B2 |
| APPLICATION NO. | : 11/859983 |
| DATED | : May 18, 2010 |
| INVENTOR(S) | : Marc Oliver Tiemann |

It is certified that error appears in the above-identified patent and that said Letters Patent is hereby corrected as shown below:

Title page:

Item (73) Assignee, change the spelling of the assignee from "Joannes Heidenhain GmbH" to --Dr. Johannes Heidenhain GmbH--.

Signed and Sealed this

Fourteenth Day of September, 2010

David J. Kappos
*Director of the United States Patent and Trademark Office*